B. GRAEMIGER.
APPARATUS FOR DRIVING MACHINES.
APPLICATION FILED MAY 5, 1914.

1,233,569.

Patented July 17, 1917.

Witnesses
E. Leckert
M. J. L. Higgins.

Inventor:
Benjamin Graemiger.
By Henry Orth Jr.
Atty.

UNITED STATES PATENT OFFICE.

BENJAMIN GRAEMIGER, OF ZURICH, SWITZERLAND, ASSIGNOR TO AKTIENGESELLSCHAFT DER MASCHINENFABRIKEN ESCHER, WYSS & CO., OF ZURICH, SWITZERLAND, A CORPORATION OF SWITZERLAND.

APPARATUS FOR DRIVING MACHINES.

1,233,569.   Specification of Letters Patent.   Patented July 17, 1917.

Application filed May 5, 1914. Serial No. 836,491.

*To all whom it may concern:*

Be it known that I, BENJAMIN GRAEMIGER, a citizen of the Republic of Switzerland, residing at 19 Hardturmstrasse, Zurich, Switzerland, have invented new and useful Improvements in Apparatus for Driving Machines; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

This invention relates to apparatus for driving machines, wherein electro-dynamic or purely magnetic forces are used and the driving and driven members are separated from each other in a gas tight manner without the provision of a stuffing box by a partition or wall. According to the invention a metal alloy of great strength and which is a very bad electrical conductor is employed for the separating partition between the driving and driven members. The invention consists particularly in the use of a special steel, which is a very bad electrical conductor.

A power driven machine inclosed in a casing can be driven for instance, from the exterior without involving the use of a stuffing box by inclosing the rotor of an electromotor of any suitable construction coupled to the shaft of said machine in said casing and by separating the driving member, that is to say the stator of the motor in a gas tight manner from the rotor by a wall or partition forming a part of the casing. In order that the efficiency of the motor may be as high as possible notwithstanding the partition wall between the rotor and the stator the material to be used for such partitions must fulfil the following main requirement:

The material must have an electric resistance as high as possible in order to minimize the currents set up in the wall and the consequent losses. There is further to choose between materials which are magnetizable and such which are practically non-magnetizable. If the partition wall is non-magnetizable the air-gap of the motor will be increased to an amount corresponding to the thickness of the wall. The magnetization current must then be increased as compared with arrangements provided with a gap having the usual small size and for a certain output the motor has to be made of a larger size than would be the case if the conditions were normal. Besides the efficiency is impaired, and in a three-phase motor also the power-factor will be smaller.

On the other hand, if a magnetizable metal is used, the magnetic leakage or dispersion in the stator is facilitated, so that also in this instance an increase of the magnetization current will take place. The results are in general the same as in the case, when a non-magnetizable metal is used. It has been found that under the same circumstances (same thickness of the wall and same electrical resistance) the efficiency and the power-factor will not vary very much if non-magnetizable walls are used instead of magnetizable ones, and in order to ascertain which metal is used with best advantage, every single case has to be considered separately.

If the metal alloy of high ohmic resistance is magnetizable, it is preferable to provide also between the partition wall and the stator-box a small air-gap. The leakage is then made more difficult.

In all cases, however, the metal must be of great strength so that the partition wall can be made thin and thus avoid unduly increasing of the distance between the rotor and the stator by the interposed partition as compared with arrangements where a motor of the same size, not fitted with a separating partition is employed. Besides this, the eddy-current losses and the losses through the short circuiting of the lines of forces will be the less the thinner the partition.

With a view to insuring a gas-tight joint of the partition with the rest of the casing it is advantageous to employ a metal capable of being brazed or welded.

All these combined requirements are best fulfilled according to this invention by using as the material for the separating wall a metal alloy having great strength and which is a very bad conductor of electricity. Certain special steels are particularly well adapted for being employed for such walls.

An alternative method of driving a machine inclosed in a casing without the use of a stuffing box consists in employing an electro-dynamic or purely a magnetic clutch of any suitable construction, wherein the peripherally acting force required for transmitting the motive power or output is provided by the magnetic flux lines between the two clutch elements without contact between such elements, so that therefore one of the clutch elements can be inclosed in the casing with the machine to be driven, while the other clutch element, driven by a motor of any kind, is arranged outside the casing. The separating partition between the two clutch elements and which forms part of the casing must be capable of fulfilling the same requirements as in the former case, that is to say, where an electro-motor is used, since also in this case there has to be avoided as far as possible the formation of eddy-currents in the partition and there has to be reduced to a minimum the distance of gap between the two clutch members in order to hold the number of ampere-windings necessary for the excitation of the magnet as small as possible and to minimize the loss in the output due to such gap.

It has been found that it is much better to employ in magnetic clutches non-magnetizable partitions, since much better results will then be obtained. According to the present invention the partition will be made also in this instance preferably of a metal alloy, which is a very bad conductor of electricity. In all cases the main feature of this invention consists in employing a metal alloy for the separating wall having a high ohmic resistance. This is contrary to all that which has been previously proposed. Hitherto, it was the general belief, that only non-conductors (ebonite or fiber) could be employed for such partition walls or alloys of low ohmic resistance, e. g., good electrical conductors. It is a fact that in employing materials electrically non-conducting, eddy-currents are entirely eliminated. But if such walls should have the desired strength and density, it is necessary to make them of such a thickness, that such arrangements of driving apparatus, either in the form of a motor or a clutch could hardly be carried out owing to the great distance between the driving and driven members. It is moreover very difficult to connect permanently in a fluid tight manner a partition wall made of a non-metal to the rest of the casing. Such a tight connection may be effected in a much better manner, if metals are used, which are capable of being brazed or welded to the casing. High per cent. manganese-steel or nickel-manganese-steel are for instance alloys having a very high electrical resistance and great strength. According to the treatment of these alloys in the heat, they may be either magnetizable or practically non-magnetizable. Further, high per cent. nickel-steel and silicon-steel with 5% silicon may also be employed for such partition walls. Some of these alloys have an electrical resistance which is nearly a hundred times greater than that of the copper, and the theory and the practice have shown, that this is more than sufficient to minimize the losses due to eddy-currents to such an extent that they cannot be of great harm.

Driving arrangements embodying this invention are specially adapted for instance for driving the compressor of an ice or refrigerating machine, such compressor being entirely inclosed in a casing forming the delivery or suction chamber. In this way all need for the use of a stuffing-box which would be in communication on one side with the atmosphere, is obviated and thus the loss of the working fluid or the entrance of air in said chamber is rendered impossible.

Two examples of apparatus according to the invention are illustrated in the accompanying drawing.

Figure 1:
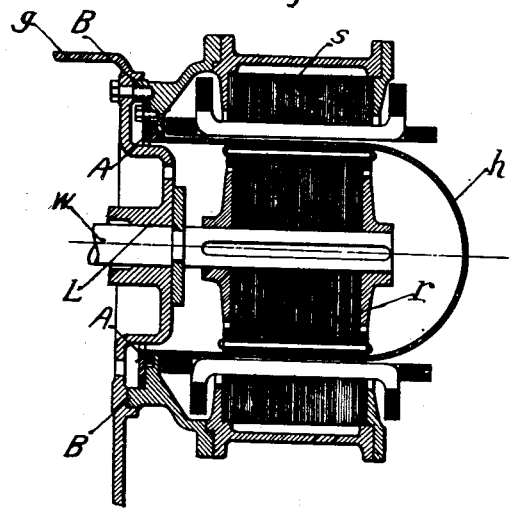
Figure 1 is a vertical section of a three-phase motor.
Figure 2:
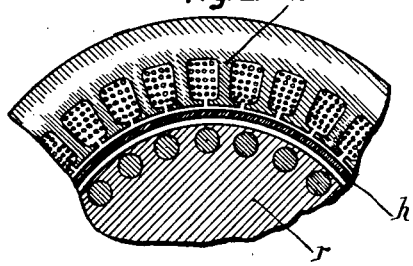
Fig. 2 is an enlarged detail section at right-angles to the axis of the motor.

Fitted within the central boring in the stator $s$ of the motor is a sleeve $h$ made of a non-magnetic metal alloy of great strength and which is a bad conductor of electricity. This sleeve is connected to the stator $s$ at A by brazing, so as to form a gas-tight joint, and a similar joint is made at B between the stator and the casing $g$. The rotor $r$, which in this example is constructed in the form of a short circuited armature, is keyed to the shaft $w$, of the machine to be driven, said shaft being supported in a bearing L, formed in the casing $g$ which incloses said machine. The sleeve $h$ when magnetic will not be arranged with a close fit within said boring of the stator $s$, but will be preferably arranged in such a manner that a small clearance is left between the sleeve and the stator to reduce the magnetic dispersion. This is clearly shown in Fig. 2 drawn on a larger scale. This figure shows a section at right angles to the axis of the motor through the stator s, the sleeve h and the rotor r. From this figure it will be seen, that no contact of metallic parts takes place between the stator s and the sleeve h. The clearance provided between these parts may be filled up by a paper-layer, a coating or the like.

Figure 3:
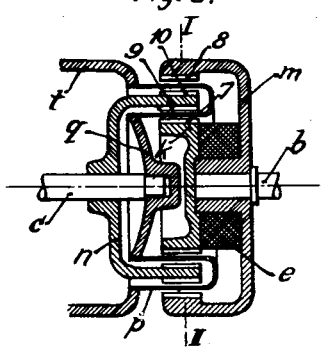
Fig. 3 is a vertical section of an electro-magnetic clutch.
Figure 4:
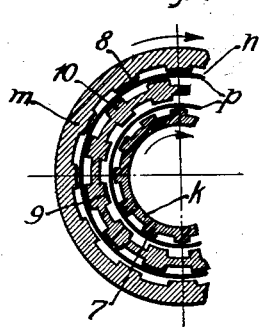
Fig. 4 is a transverse section taken on line I—II of Fig. 3.

Figs. 3 and 4 illustrate an example for an arrangement wherein the driving and the driven members of an electro-magnetic clutch are separated from each other in a gas-tight manner, that is to say, a case where purely magnetic action is employed for transmitting power. On the shaft b, driven by a prime mover or machine of any kind, is keyed the driving member of the clutch, consisting of two disks k and m between which is arranged the winding e required for excitation purposes. The two disks k and m have cylindrical polar surfaces arranged facing each other and formed with projections 7 and 8 respectively. The driven clutch member is keyed on the shaft c of the machine to be driven and consists of a bell shaped disk n, the cylindrical portion of which extends between the two polar surfaces of the driving clutch member and is also formed with projections 9 on the inside and projections 10 on the outside. The separating partition p arranged between the two clutch members is in the form of a ring of U-section and is connected in a gas-tight manner to the parts q and t of the casing. The action of the clutch is due to the fact that the magnetic flux lines, generated by the energizing winding, set up, in passing from the polar projections 7 and 8 of the driving clutch member to the polar projections 9 and 10 of the driven clutch member, (there being a certain amount of angular displacement between the said polar projection), a component of force in a peripheral direction, see Fig. 4, which is a part vertical section corresponding to the line I—II at right angles to the axis of the clutch. In accordance with the invention a non-magnetic metal alloy of great strength and having as high an ohmic resistance as possible is employed for the separating partition p. In this arrangement it is better to use a non-magnetizable alloy instead of a magnetizable one.

The subject matter of the present invention, that is, the partition wall consisting of a metal alloy having a very high ohmic resistance, may be employed in connection with every kind of electromotors, electrodynamic and magnetic clutches.

Having now particularly described and ascertained the nature of my said invention and in what manner the same is to be performed, I declare that what I claim is:

1. In an apparatus for driving a machine by means of electro-dynamic or purely magnetic action, a driving member, a driven member, and a partition wall separating said members from each other in a gas-tight manner, said wall being constructed of a metal alloy having a very high ohmic resistance and great strength.

2. In an apparatus for driving a machine by means of electro-dynamic or purely magnetic action, a driving member, a driven member, and a partition wall separating said members from each other in a gas-tight manner, said wall being constructed of a practically non-magnetizable metal alloy having a very high ohmic resistance and a great strength.

3. In an apparatus for driving a machine by means of electro-dynamic or purely magnetic action, a driving member, a driven member and a partition wall separating said members from each other in a gas-tight manner, said wall being constructed of a steel alloy having a very high ohmic resistance.

4. In a device for driving a machine by means of an electromotor including a stator, a rotor, and a partition wall separating said rotor and stator and inclosing said rotor from the stator in a gas-tight manner, said partition wall being constructed of a metal alloy having a very high ohmic resistance and great strength.

5. In a device for driving a machine by means of an electromotor including a stator, a rotor and a partition wall separating said rotor and stator and inclosing said rotor from the stator in a gas-tight manner, the improvement which consists in constructing said partition wall of a non-magnetizable metal alloy of a high per cent. nickel steel having a very high ohmic resistance and great strength.

In testimony that I claim the foregoing as my invention, I have signed my name in presence of two subscribing witnesses.

BENJAMIN GRAEMIGER.

Witnesses:
  CARL GUBLER,
  ARNOLD LEHNER.